No. 866,519. PATENTED SEPT. 17, 1907.
J. J. RHODES & J. MILLAR.
SCRAPER FLIGHT FOR CONVEYER CHAINS.
APPLICATION FILED DEC. 14, 1906.
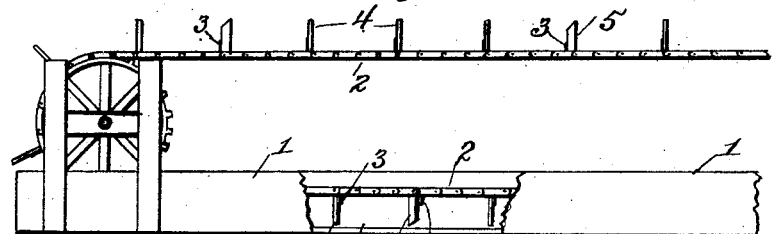
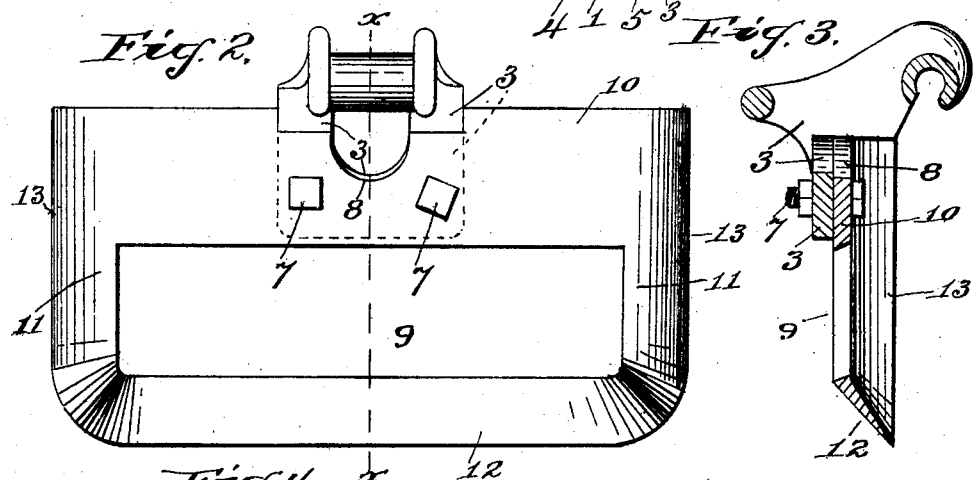
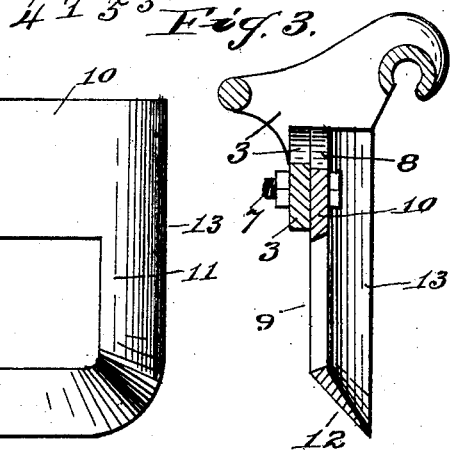
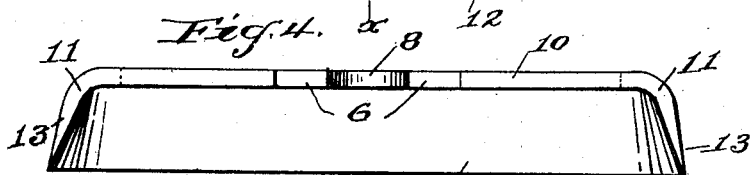
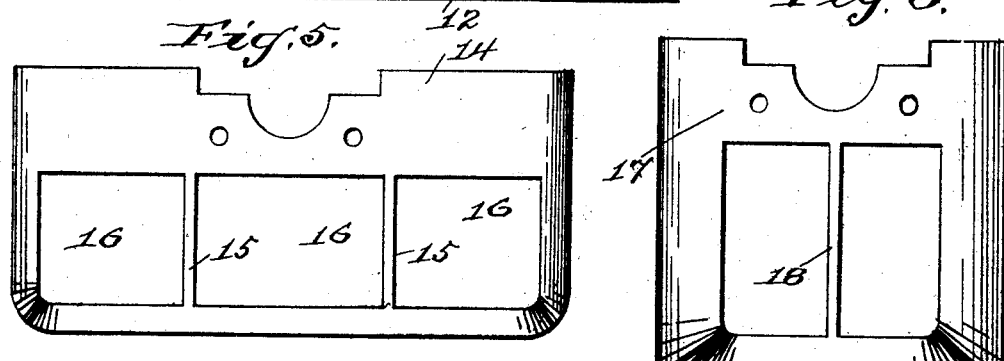
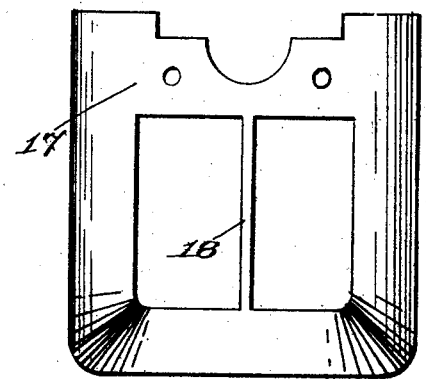
Witnesses:
Inventors
Jesse J. Rhodes 2nd
John Millar
By ... Attorney.

UNITED STATES PATENT OFFICE.

JESSE J. RHODES, OF NEWBERN, NORTH CAROLINA, AND JOHN MILLAR, OF CINCINNATI, OHIO.

SCRAPER-FLIGHT FOR CONVEYER-CHAINS.

No. 866,519.      Specification of Letters Patent.      Patented Sept. 17, 1907.

Application filed December 14, 1906. Serial No. 347,890.

*To all whom it may concern:*

Be it known that we, JESSE J. RHODES and JOHN MILLAR, citizens of the United States, residing, respectively, at Newbern, in the county of Craven and State of North Carolina, and Cincinnati, in the county of Hamilton and State of Ohio, have invented certain new and useful Improvements in Scraper-Flights for Conveyer-Chains, of which the following is a specification.

This invention relates to a device adapted to be used in connection with conveyer flights and troughs, and has special reference to means carried by a conveyer chain for assisting the flights in carrying certain material through and from the troughs.

The object of the invention is to provide a device adapted to be attached to a conveyer chain at intervals between the conveyer flights for preventing the material to be conveyed from clogging up the conveyer troughs, and for loosening the material, and for scraping the sides and bottom of the trough when occasion may demand.

A further object of the invention is to provide in a drag chain conveyer having the usual flights, a series of supplemental separating or scraping flights hung from the conveyer chain and intervening certain of the conveyer flights at intervals throughout the chain.

A still further object of the invention is to provide a separator, agitator and scraper in one and the same device capable of being carried by a conveyer chain through a trough or other receptacle containing the material to be conveyed, or through which said material is conveyed, for the purpose of relieving the conveyer flights of the usual difficulty in moving certain kinds of material.

In operating drag flights or conveyers in certain kinds of material, the latter becomes bulked, hardened and packed in the trough and adheres thereto, so that the flights cannot move it but are dragged over the surface thereof.

It is therefore the purpose of this invention to provide a device adapted to be drawn through such material so as to leave the latter in loose condition for the conveyer flights.

With these and various other objects, advantages and improved results in view, the invention consists in a scraper adapted to be connected to a drag or conveyer chain and having a series of cutting or scraping edges.

In the accompanying drawings forming part of this application: Figure 1 is a side elevation showing the device operated in a trough with the latter partly broken away. Fig. 2 is a front view of one of the scrapers attached to a chain bracket. Fig. 3 is a section on the line *x—x* Fig. 2. Fig. 4 is a top view of the scraper. Fig. 5 is an elevation of a modification. Fig. 6 is an elevation of a further modification.

The same reference numerals denote the same parts throughout the several views of the drawings.

The trough 1, is of ordinary form or construction, and the drag chain 2 is one of the common forms having brackets 3, to certain of which suitable conveyer flights 4, are attached. The other of said brackets have the separators, cutters or scraper flights 5 attached.

Central of the top edge of the scraper flight 5, is a seat 6, for the bracket 3, which is secured to the scraper by suitable bolts 7, and central of the seat is a cut-out 8, to permit free working of the scraper over sprocket wheels. A rectangular opening 9, is made in the scraper so as to leave a top plate 10, and end pieces 11, the inner edge of said pieces and plate being beveled. The bar 12, at the bottom of the said opening connects the end pieces 11, and said bar inclines downwardly and outwardly from the opening 9, and its outer edge is beveled so as to form a horizontal cutter or scraper. The end pieces 11, have an outwardly flaring flange 13, provided with a beveled edge forming a vertically disposed cutter or scraper. The bar 12, and flanges 13 furnish a continuous cutting or scraping edge, and the opening 9, affords a passage for the material loosened by the bar and the end pieces. As the scrapers are dragged through the material, the edge of the bar and the flanges remove such material as may have adhered to the trough, or may have become hardened or otherwise incapable of being moved by the conveyer flights.

Referring to the modification shown in Fig. 5, the scraper 14 is intended for wide troughs, and is provided with breaker bars 15, between the openings 16.

The modification shown in Fig. 6, represents a scraper 17, adapted for deep troughs, and is provided with a single breaker bar 18. This bar as well as the bars 15, not only assist in breaking, separating and mixing the material for the conveyer flights but they brace and strengthen the device materially.

We do not wish to be understood as confining the invention to any special size shape or material, to the number of scraping or cutting edges, nor to the manner of attaching or connecting the device to a drag chain or cable, and while the invention is shown applied to a horizontally moving chain it may be employed in the same capacity in a vertically moving chain.

Having thus described our invention what we claim as new and desire to secure by Letters Patent is:

1. A device adapted to be attached to a conveyer chain comprising a flight or plate having a passage therethrough, and cutting or scraping edges projecting from the plate, in the direction of the travel of the flights.

2. A drag-chain conveyer flight having an opening therethrough for the passage of material, a flight portion between the opening and the chain and attached to the latter, and cutters partly surrounding the opening.

3. The combination, with a drag chain employing suitable conveyer flights, of a scraping or cutting flight inflexibly hung from the chain between certain of the conveyer flights and adapted to plow through the material to be conveyed in advance of certain of the conveyer flights.

4. The combination, of a drag chain employing suitable conveyer flights, of a supplemental flight fixed to the chain and having a passage therethrough, scraping or cutting ends, and a scraping or cutting bar connecting said ends, the cutting edge of said bar and ends projecting in the direction of the travel of the flights.

5. The combination, with a drag-chain employing suitable conveyer flights, of a supplemental flight comprising a portion rigidly connected centrally to the chain, and cutters which form with said portion an opening for the passage of material.

6. The combination, with a drag-chain employing suitable conveyer flights, of a supplemental flight having a portion rigidly connected to the chain, a cutter parallel with said portion leaving a passage for material therebetween, and cutting flanges at the terminus of said portion and of said cutter.

7. The combination, with a drag chain employing suitable conveyer flights, of the supplemental flights having a barred opening partly surrounded by cutting or scraping edges.

In witness whereof we hereunto set our hand in the presence of two witnesses.

JESSE J. RHODES.
JOHN MILLAR.

Witnesses to Jesse J. Rhodes:
   J. M. HOWARD,
   W. P. M. BRYAN.

Witnesses to John Millar:
   M. W. COLE,
   LACY WILLIAMS.